(12) United States Patent
Walter et al.

(10) Patent No.: US 9,306,911 B2
(45) Date of Patent: *Apr. 5, 2016

(54) CREDENTIALS MANAGEMENT IN LARGE SCALE VIRTUAL PRIVATE NETWORK DEPLOYMENT

(71) Applicant: Palo Alto Networks, Inc., Santa Clara, CA (US)

(72) Inventors: Martin Walter, Livermore, CA (US); Nicholas Campagna, San Jose, CA (US); Yueh-Zen Chen, San Jose, CA (US); Monty Sher Gill, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,062

(22) Filed: Jan. 13, 2015

(65) Prior Publication Data

US 2015/0195252 A1 Jul. 9, 2015

Related U.S. Application Data

(63) Continuation of application No. 13/754,796, filed on Jan. 30, 2013, now Pat. No. 8,966,260.

(51) Int. Cl.
*H04L 29/06* (2006.01)

(52) U.S. Cl.
CPC ............ *H04L 63/0272* (2013.01); *H04L 63/08* (2013.01); *H04L 63/0823* (2013.01); *H04L 63/0876* (2013.01)

(58) Field of Classification Search
CPC ........................ H04L 63/0823; H04L 63/0876
USPC ........................................................ 713/168
See application file for complete search history.

(56) References Cited

U.S. PATENT DOCUMENTS

| | | | | |
|---|---|---|---|---|
| 8,494,485 | B1 * | 7/2013 | Broch | ............................ 455/410 |
| 2007/0234047 | A1 * | 10/2007 | Miyazawa | ..................... 713/158 |
| 2008/0034204 | A1 * | 2/2008 | Lakshminarayanan | .................... H04L 63/0823 713/158 |
| 2009/0287935 | A1 * | 11/2009 | Aull | ....................... H04L 9/3263 713/182 |
| 2011/0004763 | A1 * | 1/2011 | Sato | ......................... H04L 63/06 713/176 |
| 2011/0107414 | A1 * | 5/2011 | Diab et al. | ........................ 726/15 |
| 2011/0231662 | A1 * | 9/2011 | Sato | ...................... H04L 9/3268 713/176 |
| 2012/0266209 | A1 * | 10/2012 | Gooding | .................. H04L 63/20 726/1 |
| 2013/0346745 | A1 * | 12/2013 | Broch | ............................ 713/156 |
| 2014/0164776 | A1 * | 6/2014 | Hook | ........................ H04L 9/14 713/17 |

* cited by examiner

*Primary Examiner* — Izunna Okeke
*Assistant Examiner* — Ali Shayanfar
(74) *Attorney, Agent, or Firm* — Van Pelt, Yi & James LLP

(57) ABSTRACT

Techniques for credentials management in large scale virtual private network (VPN) deployment are disclosed. In some embodiments, credentials management in large scale VPN deployment includes generating a public/private key pair and a certificate signing request at a satellite device; automatically communicating the certificate signing request to a portal over a public, untrusted network to authenticate the satellite device using a serial number associated with the satellite device, in which the certificate signing request and the serial number are verified by the portal; and receiving a certificate from the portal for using to establish VPN connections and configuration information for the satellite device, in which the certificate includes a credential signed by a trusted certificate authority, and the configuration information includes gateway configuration information identifying a plurality of gateways to which the satellite device is configured to connect using VPN connections.

36 Claims, 10 Drawing Sheets

New IPSec Tunnel

| | |
|---|---|
| Name | My Satellite Tunnel |
| Tunnel Interface | tunnel.12 ▼  New... |
| Type | ○ Auto Key  ⊙ GlobalProtect Satellite  ○ Manual Key |

General | Advanced

| | |
|---|---|
| Portal Address | gpsatportal.company.com |
| Interface | ethernet1/1 ▼ |
| Local IP Address | Dynamic-DHCP Client ▼ |

[Ok] [Cancel]

---

New IPSec Tunnel

| | |
|---|---|
| Name | My Satellite Tunnel |
| Tunnel Interface | tunnel.12 ▼  New... |
| Type | ○ Auto Key  ⊙ GlobalProtect Satellite  ○ Manual Key |

General | Advanced

Routes Published to GlobalProtect Gateways

| ☐ Subnet |
|---|
| ☐ 192.168.100.0/24 |
| ☐ 10.1.100.0/24 |

[Ok] [Cancel]

External CA

| | |
|---|---|
| Local Certificate | MyLSVPNCertificate ▼ |
| Client Certificate Profile | LSVPNCertVerificationProfile ▼ |

[Ok] [Cancel]

FIG. 8

| | GlobalProtect Satellite Configuration and Runtime Status | | | | | |
|---|---|---|---|---|---|---|
| | Name | My Satellite Tunnel | | | | |
| | Portal Address | gpsatportal.company.com | | | | |
| | Portal Status | Connection Successful - 3/29/2011 13:02:22 (refresh portal config) | | | | |
| | Interface | ethernet1/1 | | | | |
| | Tunnel Interface | tunnel.12 | | | | |
| | Local IP | 6.1.1.1 | | | | |

| ☐ | Gateway | Status | GW IP | GW Tunnel IP | Local Tunnel IP | Tunnel Monitor | Route Sharing |
|---|---|---|---|---|---|---|---|
| ☐ | GW1 | Active Established 3/29/11 14:08:33 | 7.2.2.1 | 10.123.100.254/24 | 10.123.100.1 | Interval - 2 Sec Threshold - 5 | Received GW Access Routes: 10.1.0.0/16, 10.2.0.0/16 Sat. Routes Rejected by GW: 10.3.100.0/24 |
| ☐ | GW2 | Inactive GW Reachability lost 3/28/11 12:34:56 | 12.2.3.43 | 10.123.101.254/24 | 10.123.101.20 | Interval - 2 Sec Threshold - 5 | Received GW Access Routes: 10.1.0.0/16, 10.2.0.0/16 Sat. Routes Rejected by GW: 10.3.100.0/24 |
| ☐ | GW3 | Inactive GW Certificate Became Invalid 3/28/11 12:34:56 | 15.55.3.143 | 10.123.102.254/24 | 10.123.102.21 | Interval - 2 Sec Threshold - 5 | Received GW Access Routes: 10.1.0.0/16, 10.2.0.0/16 Sat. Routes Rejected by GW: 10.3.100.0/24 |

[Reconnect to GW] [Refresh GW Config]

[Close]

FIG. 9

CREDENTIALS MANAGEMENT IN LARGE SCALE VIRTUAL PRIVATE NETWORK DEPLOYMENT

CROSS REFERENCE TO OTHER APPLICATIONS

This application is a continuation of co-pending U.S. patent application Ser. No. 13/754,796, entitled CREDENTIALS MANAGEMENT IN LARGE SCALE VIRTUAL PRIVATE NETWORK DEPLOYMENT filed Jan. 30, 2013, which is incorporated herein by reference for all purposes.

BACKGROUND OF THE INVENTION

A virtual private network (VPN) extends a private network and the resources contained in the private network across public (e.g., untrusted) networks such as the Internet. For example, a VPN can enable a host computer to send and receive data across shared or public, untrusted networks by emulating the properties of the private network, such as shares, server access, and printers by establishing and maintaining certain security and management policies of the private network. This is generally implemented by establishing a virtual point-to-point connection through the use of either a dedicated connection or through a secure connection (e.g., secure network communications using various encryption techniques), or a combination of both.

A VPN connection across the Internet logically operates as a wide area network (WAN) link between the sites. A secure connection across the Internet appears to a user as a private network communication. However, this communication actually occurs over a public, untrusted network (e.g., the Internet), which is, thus, referred to as a virtual private network.

BRIEF DESCRIPTION OF THE DRAWINGS

Various embodiments of the invention are disclosed in the following detailed description and the accompanying drawings.

FIG. 8 is a computer screen diagram of a graphical user interface of a portal for configuring and managing credentials management in large scale VPN deployment in accordance with some embodiments.

FIG. 9 is another computer screen diagram of a graphical user interface of a portal for configuring and managing credentials management in large scale VPN deployment in accordance with some embodiments.

DETAILED DESCRIPTION

Figure 1:
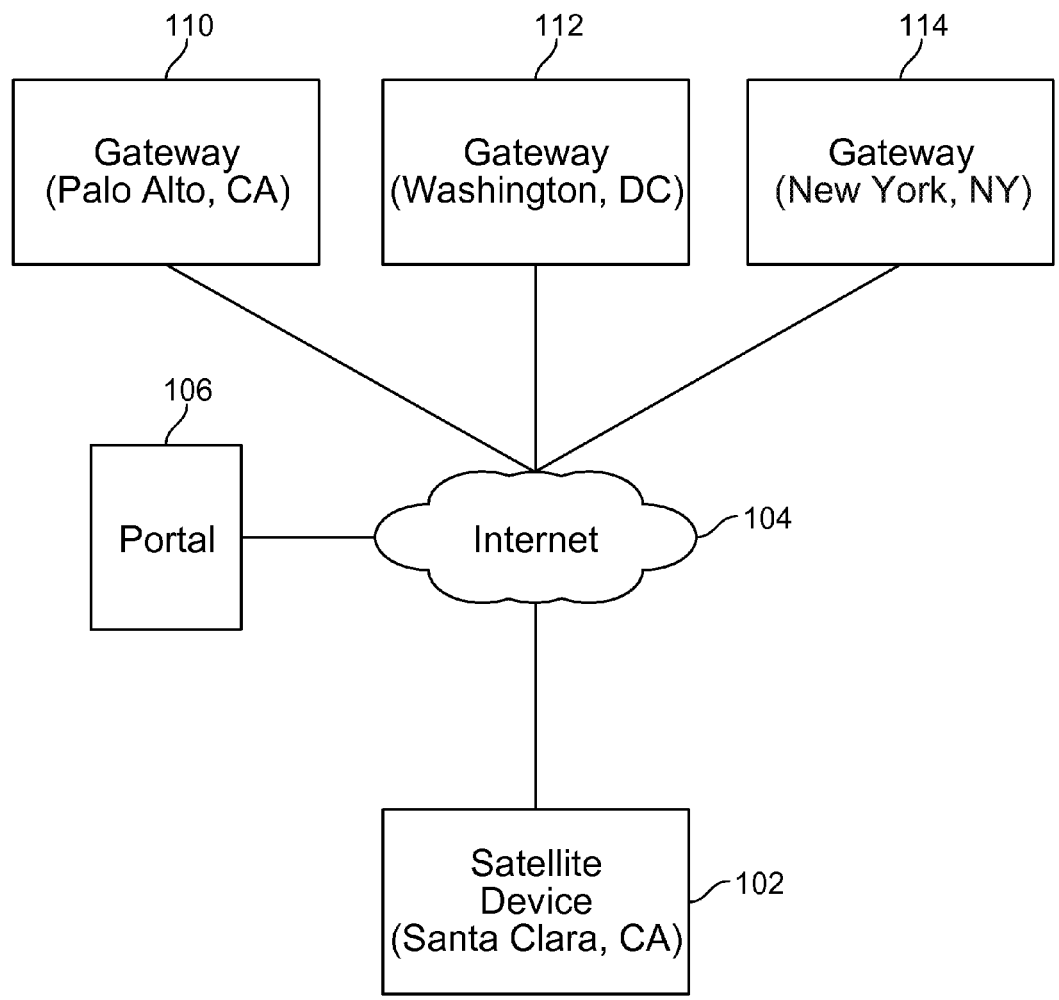
FIG. 1 is a functional block diagram illustrating an architecture for credentials management in large scale VPN deployment in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A virtual private network (VPN) extends a private network and the resources contained in the private network across public (e.g., untrusted) networks such as the Internet. For example, a VPN can enable a host computer to send and receive data across shared or public, untrusted networks by emulating the properties of the private network, such as shares, server access, and printers by establishing and maintaining certain security and management policies of the private network. This is generally implemented by establishing a virtual point-to-point connection through a secure connection (e.g., secure network communications using various encryption techniques).

A VPN connection across the Internet logically operates as a wide area network (WAN) link between the sites. A VPN connection can provide a secure connection across the Internet that appears to a user as a private network communication. However, this communication actually occurs over a public, untrusted network (e.g., the Internet), which is, thus, referred to as a virtual private network (VPN).

For example, VPNs can be either remote-access (e.g., connecting an individual computer to a network) or site-to-site (e.g., connecting two networks together). In an enterprise computing environment (e.g., for corporations, government organizations, and/or other entities), remote-access VPNs can be used to allow employees to access their company's intranet from home or while traveling outside the office. Also, in an enterprise computing environment, site-to-site VPNs can be used to allow employees in geographically separated offices to share one cohesive virtual network (e.g., Santa Clara and Palo Alto offices for a company based in California can be connected using a site-to-site VPN).

Thus, VPN systems can be used to provide such site-to-site secure network connectivity for enterprise computing environments. These VPN systems can use various protocols to securely tunnel network traffic over untrusted, public networks and can be implemented using various levels of security and related requirements and configurations.

In particular, VPNs typically require remote access to be authenticated and make use of encryption techniques to prevent disclosure of private information. VPNs provide security through tunneling protocols and security procedures, such as encryption. VPNs can thereby provide for secure communications and confidential data communications such that even if traffic is sniffed, an attacker would only see encrypted data that he/she cannot understand. VPN communications also allow for message integrity to detect any instances of transmitted messages having been tampered with or otherwise compromised.

Well known secure VPN protocols include the following: Internet Protocol Security (IPSec); Transport Layer Security (SSL/TLS); Datagram Transport Layer Security (DTLS); and various other well-known VPN protocols. For example, when a VPN client communicates with an enterprise's server, it prepares a packet addressed to that server, encrypts it and encapsulates it in an outer VPN packet, such as an IPSec packet. This packet is then sent to the enterprise's VPN server (e.g., a server/firewall or other security gateway or appliance) over the public Internet. The inner packet is encrypted so that even if someone intercepts the packet over the Internet, they cannot get any information from it (e.g., they can see that the remote host is communicating with a server/firewall, but none of the contents of the communication can be understood due to the encryption). Thus, using such VPN techniques, secure communications can be provided over untrusted (e.g., public) networks, such as the Internet.

Tunnel endpoints generally need to authenticate before secure VPN tunnels can be established. User-created remote access VPNs can use passwords, biometrics, two-factor authentication, and/or other cryptographic techniques. Network-to-network VPN tunnels often use digital certificates (e.g., certificates) and/or passwords, as they permanently store the key(s) to allow the tunnel to establish automatically and without user intervention.

Current approaches also typically require administrators (e.g., Information Technology (IT), network, or security admins) to manually configure, for example, hundreds to thousands of network devices for secure communications across an enterprise (e.g., often simply using a spreadsheet for configuration information for such devices, to manually configure and manage the key exchange for each of such devices). This approach clearly does not scale well as it is inefficient and prone to human error. Also, existing approaches often use a symmetric key implementation, such as from commercial vendors (e.g., Cisco and other vendors), which would have a single point of failure at the central authority of their symmetric key system.

What are needed are improved techniques for credentials management in large scale virtual private network (VPN) deployment.

Accordingly, various techniques for credentials management in large scale virtual private network (VPN) deployment are disclosed. In some embodiments, using various techniques described herein provides credentials management in large scale VPN deployment and facilitates setting up dynamic VPN networks. For example, these techniques can be used to implement a large scale VPN network to facilitate VPN connections between network devices (e.g., gateways, security appliances, and/or other network devices that include VPN client functionality) in branch offices of an enterprise to connect to enterprise gateways automatically with manageable configuration steps. As another example, these techniques can also be applied to corporate firewalls deployed in branch locations in order to simplify and automate large VPN network deployments.

In some embodiments, credentials management in large scale VPN deployment includes generating a public/private key pair and a certificate signing request at a satellite device; automatically communicating the certificate signing request to a portal over a public, untrusted network to authenticate the satellite device using a serial number associated with the satellite device, in which the certificate signing request and the serial number are verified by the portal; and receiving a certificate from the portal for using to establish VPN connections and configuration information for the satellite device, in which the certificate includes a credential signed by the portal as a trusted certificate authority, and the configuration information includes gateway configuration information identifying a plurality of gateways to which the satellite device is configured to connect using VPN connections. For example, asymmetric keys can be used with these techniques, and, thus, this system does not have a single point of failure problem, which is a shortcoming of symmetric key systems as discussed above.

In some embodiments, the satellite device is a security appliance that includes a VPN client, and the configuration information further includes a firewall policy (e.g., one or more firewall rules).

In some embodiments, the certificate is a short term life certificate. In some embodiments, the portal sends a unique short term life certificate to each VPN client of the plurality of gateways. In some embodiments, the portal sends a unique short term life certificate to each VPN client of the plurality of gateways, and the portal automatically sends out new STL certificates to each of the plurality of gateways prior to expiration of the STL certificates (e.g., unless one or more of the gateways has been configured to be removed from the gateway configuration, that is, revoked).

In some embodiments, the certificate further includes identification of one or more trusted certificate authorities. In some embodiments, the authentication request is verified by the portal using Public Key Infrastructure (PKI). In some embodiments, the authentication request is verified by the portal using Public Key Infrastructure (PKI), and the portal is a trusted certificate authority.

In some embodiments, credentials management in large scale VPN deployment further includes automatically connecting the satellite device to each of the plurality of gateways using the certificate to authenticate the satellite, in which the satellite attempts to establish VPN connections with each of the plurality of gateways.

In some embodiments, credentials management in large scale VPN deployment further includes automatically connecting the satellite device to a first gateway using the certificate to authenticate the satellite, in which the first gateway verifies that the certificate is from a trusted certificate authority (e.g., verifying the certificate chain), and in which the satellite attempts to establish a VPN connection with the first gateway.

In some embodiments, credentials management in large scale VPN deployment further includes automatically connecting the satellite device to a first gateway using the certificate to authenticate the satellite, in which the first gateway verifies that the certificate has not been revoked (e.g., using Online Certificate Status Protocol (OCSP) status information, such as by checking an OCSP list via re-key time), and in which the satellite attempts to establish a VPN connection with the first gateway.

In some embodiments, credentials management in large scale VPN deployment further includes automatically connecting the satellite device to a first gateway using the certificate to authenticate the satellite, in which the first gateway verifies that the certificate is still valid and has not expired, and in which the satellite attempts to establish a VPN connection with the first gateway.

In some embodiments, credentials management in large scale VPN deployment further includes verifying a portal certificate using a list of trusted certificate authorities that are pre-loaded on the satellite device (e.g., installed on the device prior to shipping the satellite device to a satellite office). In some embodiments, an auto renewal process is provided, in which the portal automatically renews the certificate (e.g., a short term life certificate) for the satellite device (e.g., whenever the satellite device connects to the portal or using some other push or pull technique as further described herein with respect to various embodiments).

In some embodiments, revocation of a gateway device is provided. In some embodiments, revocation of a gateway device is provided by revoking the serial number of the gateway device from the gateway configuration maintained by the portal (e.g., including removing the serial number from the OCSP list stored by the portal). In some embodiments, revocation of a first gateway device further includes a second gateway checking a revocation list at the portal, a second gateway checking a revocation list at VPN connection set-up, a second gateway checking a revocation at re-key time, and/or removing a serial number from the gateway configuration information stored at the portal (e.g., such that the first gateway can no longer renew its certificate and/or does not automatically receive a new short term life (STL) certificate, which will eventually expire).

In some embodiments, the system includes a networking device. In some embodiments, the system includes a gateway. In some embodiments, the system includes a security appliance (e.g., an integrated security appliance that includes VPN client functionality as well as other security functionality, such as firewall, intrusion detection/protection, content filtering, data loss prevention, and/or other security functionality). In some embodiments, the system includes a network routing device (e.g., a network router). In some embodiments, the system includes a programmed general purpose computer (e.g., a programmed computer, laptop, tablet, or smart phone, or another type of a network capable device with a general purpose processor that can execute security software, including VPN client functionality).

FIG. 1 is a functional block diagram illustrating an architecture for credentials management in large scale VPN deployment in accordance with some embodiments. In some embodiments, using various techniques described herein facilitates automatically setting up dynamic VPN networks for a satellite device 102 (e.g., that is deployed to a satellite office). In some embodiments, a satellite device 102 includes a computing device, such as a gateway, security appliance, network router, and/or some other computing device that can perform VPN client functionality. For example, these techniques can be used to implement a large scale VPN network to facilitate VPN connections between gateways and satellite devices in branch offices of an enterprise, such as gateway 110 in Palo Alto, Calif., gateway 112 in Washington, D.C., and gateway 114 in New York, N.Y., to connect to such gateways via the Internet 104 automatically with manageable and automated configuration steps. In some cases, the satellite device 102 can be automatically configured to establish VPN connections with each of the gateways 110, 112, and 114 (e.g., and/or with a subset of such gateways). In some cases, other satellite devices (not shown) can be automatically configured to establish VPN connections with each of the gateways 110, 112, and 114 (e.g., and/or with a subset of such gateways). As another example, these techniques can also be applied to corporate firewalls, security appliances, and/or other computing/networking devices (e.g., that include VPN client functionality) deployed in branch locations of an enterprise in order to simplify and automate large VPN network deployments.

However, establishing a large scale VPN introduces several problems. First, deploying a satellite device that is not necessarily known or setup with a gateway it is connecting to, requires a mutual authentication scheme without prior setup. Accordingly, in some embodiments, for large scale VPN authentication of the participating devices, mutually trusted certificates, issued by either an external certificate authority (CA) or issued by built-in certificate authority (CA) available through a portal 106 is provided, as further described herein with respect to various embodiments.

Second, to receive a certificate that can be used for authentication requires some initial authentication as part of an initial enrollment or boot strapping process. Accordingly, in some embodiments, this authentication and authorization is performed through the portal 106 and/or with user credentials (e.g., a user name and password) following an authentication profile configuration on the portal 106, as further described herein with respect to various embodiments.

A third problem is an ability to automatically establish proper bi-directional routing with the gateway(s). Accordingly, in some embodiments, if dynamic routing, NAT, or any other configurations or policy is required, it is either configured manually or centrally through the portal 106, as further described herein with respect to various embodiments.

In some embodiments, provisioning the satellite device 102 to securely communicate with a plurality of secure communication tunnels (e.g., VPN tunnels) to connect networks, data centers at remote sites over an untrusted, public network (e.g., the Internet 104) is provided. In some embodiments, VPN tunnels are established between two or more endpoints, such as gateways and satellite devices (e.g., using SSL, IPsec, and/or other secure communication protocols to establish a secure tunnel), to facilitate secure communications between such endpoints.

These techniques can facilitate automated deployment of large scale VPN networks in various use case scenarios. As an example, a large retailer can send out satellite devices (e.g., security appliances or other networking devices) to each of its branch stores in twenty different cities in Maryland, N.J., New York, and Virginia. The satellite devices can be initially configured manually or through some other rapid deployment mechanism. At each branch store, a local administrator enters a portal address (e.g., a URL for communicating with the portal 106, which can also be pre-configured in the satellite device such that an administrator simply needs to connect the satellite device to the network and boot-up the satellite device, which can execute a boot-up process or script that includes automatically attempting to connect to the portal using the portal address), and the satellite device automatically registers with the portal (e.g., the portal verifies the satellite device, and then the portal sends a certificate and gateway configuration information to the satellite device). This process can be performed for each of the satellite devices at each of the branch stores. At this point, each of the satellite devices can automatically establish VPN connections with the enterprise gateways for the large retailer based on the gateway configuration information (e.g., pre-configured gateway configuration information). In some cases, the satellite devices can be deployed in high availability pairs or as standalone devices, and the satellite devices can also have redundant Internet connections.

As another example, a portal administrator can manually add a serial number of a new satellite (e.g., a new satellite device) to a list of satellites. The new satellite is shipped to a remote branch office. The local administrator at the remote branch office can execute the initial setup of the new satellite including entering a portal address so that the new satellite can communicate with the portal. The new satellite authenticates to the portal by communicating over the Internet, the new satellite device then receives its certificate and gateway configuration information from the portal, and the new satellite then establishes VPN tunnels with each gateway based on the gateway configuration information and using the certificate to authenticate the new satellite to each of the gateways.

As yet another example, the portal administrator does not add the serial number of the new satellite, but rather allows the local administrator to authenticate on behalf of the new satellite and register its serial number with the portal. In this use case scenario, the local administrator can perform the initial setup including entering the portal address (e.g., and committing the new configuration). In this case, because the device cannot authenticate to the portal with its serial number, the new satellite notifies the local administrator and prompts for authentication credentials (e.g., user credentials of an authorized administrator, such as a user name and password). The engineer can then enter the necessary authentication credentials, the device can then authenticate to the portal. In response, a new satellite entry is created at the portal for the newly authenticated satellite, and the certificate and gateway configuration information are downloaded to the new satellite. At this point, the new satellite can then establish VPN tunnels with each gateway based on the gateway configuration information and using the certificate to authenticate the new satellite to each of the gateways. These and various other use case scenarios will be apparent in view of the various embodiments and techniques described herein.

In some embodiments, a portal (e.g., a central portal, such as a Global Protect portal provided by Palo Alto Networks, Inc.) provides a root certificate authority (CA) function for implementing a PKI based secure network communication architecture for a plurality of gateways or satellites (e.g., computing/networking devices, such as security appliances or other networking devices that include VPN client functionality) using secure communication channels (e.g., IP-SEC tunnels and/or using some other secure communication protocols). In some embodiments, upon boot-up of a satellite device 102, the satellite device 102 attempts to connect to the portal 106 (e.g., the portal address, such as a URL, can be pre-configured on the satellite device before it is shipped to a remote/branch office for deployment, or a local administrator can enter the portal address locally at the satellite device as part of the initial set-up). In some embodiments, the satellite device 102 is configured to automatically authenticate to the portal 106 (e.g., a central portal) and retrieve its certificate(s) and configuration information (e.g., including gateway configuration information) as further described herein with respect to various embodiments.

In some embodiments, the portal 106 is a fully automated, trusted certificate authority (CA) (e.g., using the Online Certificate Status Protocol (OCSP)), which can provide certificates (CERTs) to each device in the secure communication network. In some embodiments, the satellite device 102 locally generates a unique public/private key pair and then generates a Certificate Signing Request (CSR) (e.g., the CSR can include the public key as well as various meta data, such as names, dates/time-stamps, the serial number of the satellite device, and the CSR is self-signed by the satellite device using its private key). In some embodiments, this process is performed each time the satellite device communicates with the portal and communicates the CSR to the portal. The portal can verify the CSR (e.g., to verify that the message is from that satellite device) and then can extract the serial number and any other meta data information included within the CSR, thereby securely providing identifying information, such as the satellite device's serial number to authenticate the satellite device. If the portal has previously been configured to recognize that unique serial number, then the portal can provision the satellite device using various techniques as further described herein with respect to various embodiments. Otherwise, the portal determines that the VPN/security appliance needs to be configured. In this case, a local administrator (e.g., an IT, network, or security admin) can log-in remotely to the portal to configure the new satellite device (e.g., logging in using admin username/password credentials and/or other user identity verification techniques). The local admin can then configure the portal to recognize the serial number of the new satellite device and configure which other gateways/ satellites that this new satellite device should attempt to connect to. At this point, provisioning the satellite device from the portal includes receiving from the portal a unique certificate (e.g., a digital certificate, such as a Short Term Life (STL) certificate) and gateway configuration information (e.g., information for each of the gateways to connect to), as well as a list of trusted Certificate Authorities (CAs) (e.g., CAs that the satellite device can trust certificates from, such as by region, such as an Americas CA(s), an Asia Pacific (APAC) CA(s), EMEA CAs, and/or CAs for other regions).

In some embodiments, once the satellite device has been provisioned with a valid certificate and gateway configuration information, the satellite device automatically initiates VPN connections to each gateway that its gateway configuration information indicates it should attempt to connect to. In particular, the satellite device authenticates to all listed gateways (e.g., as identified in its gateway configuration information received from the portal) using its certificate, exchanges routing information with such gateways, and establishes tunnels with such gateways, as further described herein with respect to various embodiments.

For example, if the satellite device 102 in Santa Clara, Calif. attempts to connect to the gateway 110 in Palo Alto, Calif., then the satellite device 102 can send to the gateway 110 its certificate (e.g., the STL certificate that the satellite device 102 received from the portal 106) in a request using its private key to sign the request. In some embodiments, the certificate also includes OCSP information to allow the gateway 110 in Palo Alto, Calif. to verify the certificate with the CA (e.g., the portal 106 if that was the CA for the Americas, which can provide a self-contained CA implementation). Further, the satellite device 102 in Santa Clara, Calif. will receive back a certificate for the gateway 110 in Palo Alto, Calif., and the satellite device 102 can verify that certificate with the identified CA (e.g., the portal 106 in this example, as discussed above). In addition, the satellite device 102 in Santa Clara, Calif. can perform similar processes to establish secure VPN connections with each of the gateways that it is configured to connect to, including, for example, each of the other gateways 112 and 114 as shown in FIG. 1. Accordingly, using the various techniques described herein, a large scale VPN deployment is provided to automatically establish secure network connections from a satellite device with each of the gateways.

In some embodiments, Short Term Life (STL) certificates are used to facilitate management by requiring each gateway and satellite in the large scale VPN deployment to automatically attempt to renew their certificate periodically (e.g., every 24 hours, every 48 hours, once per week, and/or some other time interval, using a push and/or pull renewal approach as further described herein). Thus, if a gateway or a satellite is de-authorized/revoked, then when that device attempts to renew, the request will be denied as the portal will not issue a new STL certificate to that device, and the STL certificate expires after a predetermined period of time (e.g., 24 hours or some other time interval).

In some embodiments, updated/new certificates are timely sent (e.g., push renewal approach) to the gateways and satellites. In some embodiments, updated/new certificates are requested (e.g., pull renewal approach) by the gateways and satellites. Devices may need to be revoked for a variety of reasons, such as when a device has been decommissioned, an office closed/moved, a device was compromised, a network configuration change, and/or various other reasons. Accordingly, these techniques provide an efficient approach for managing revocation of certificates for such devices in a large scale VPN deployment (e.g., which can include hundreds to thousands of devices). Also, these techniques provide a robust approach for implementing revocation of certificates for such devices in a large scale VPN deployment (e.g., as STL certificates automatically become invalid upon expiration, which can be determined even if the portal or OCSP responder is down or otherwise unavailable, such that a device with an expired STL certificate cannot establish or maintain VPN connections with other devices in the large scale VPN deployment).

In some embodiments, the satellite request(s)/response(s) can be implemented using XML or another format using asymmetric PKI techniques. As discussed above, using asymmetric keys has various advantages over symmetric keys. For example, when using a symmetric keys approach, if the OCSP provider (e.g., server or portal that implements the OCSP provider functionality) goes down or is otherwise unavailable, then the entire secure network goes down. Thus, symmetric keys approach has a single point of failure that can cause the entire large scale VPN network to go down, and both endpoints (e.g., both devices) generally must authenticate to the OCSP if the secure network connection goes down. Also, revocation is more difficult using the symmetric keys approach.

Accordingly, using various techniques disclosed herein provides for an efficient, robust, and scalable large scale VPN network that facilitates automated deployment techniques, and which do not have a single point of failure as is present with other approaches (e.g., implementations using symmetric keys). As disclosed herein with respect to various embodiments, these techniques also provide a more flexible approach that can dynamically manage secure networks and facilitate more manageable revocation techniques as described herein. Moreover, using various techniques disclosed herein provides a scalable secure network solution that is easy to implement and manage. For example, new satellites can be pre-configured by a network administrator to make set-up and install at a remote site easy by another employee at the office for the enterprise (e.g., which need not have IT, network, and/or security admin expertise).

Figure 2:
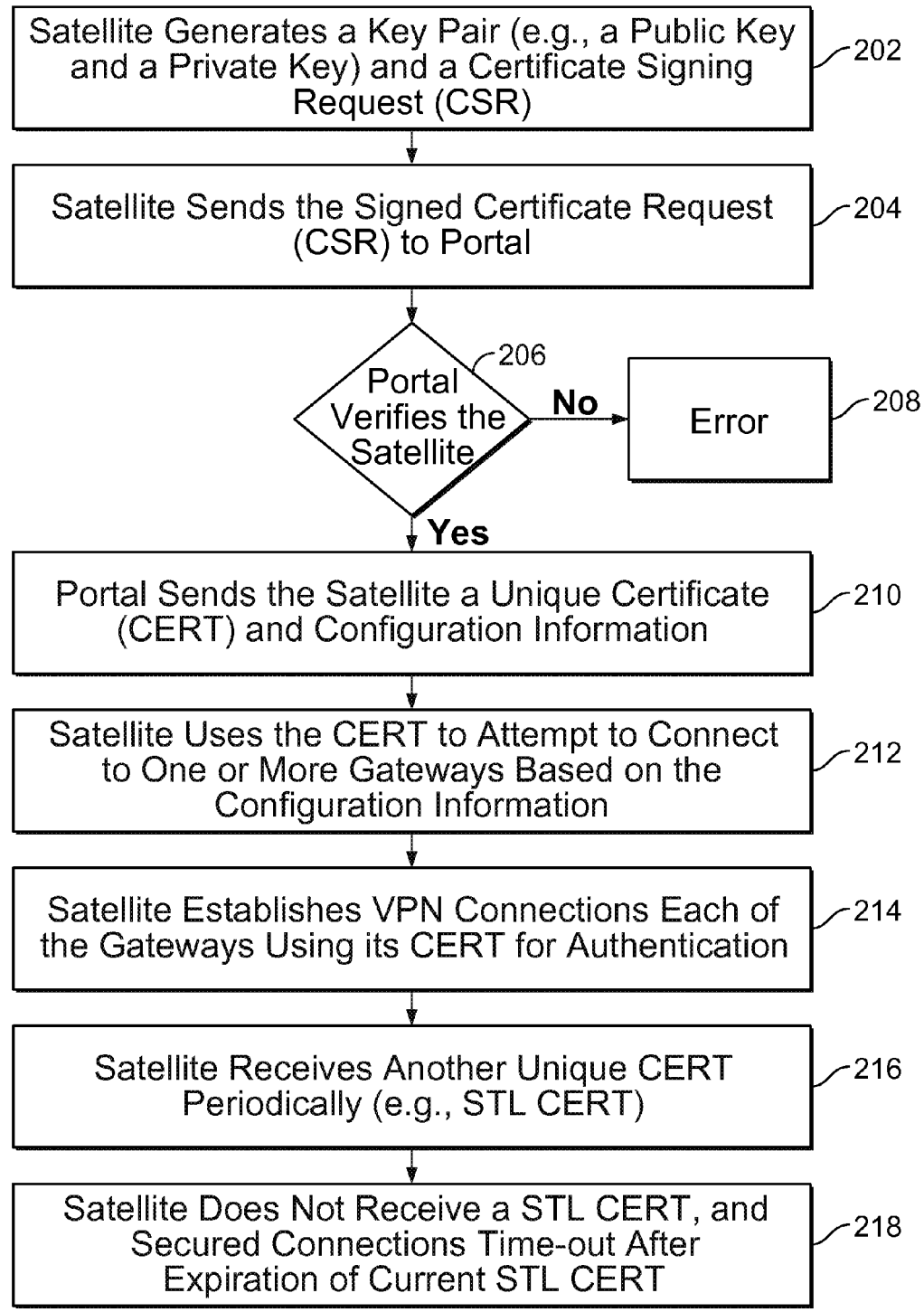
FIG. 2 is a flow diagram illustrating credentials management in large scale VPN deployment in accordance with some embodiments.

FIG. 2 is a flow diagram illustrating credentials management in large scale VPN deployment in accordance with some embodiments. In some embodiments, a configuration flow of a satellite in communication with a portal is implemented as shown in FIG. 2.

In some embodiments, an administrator (e.g., IT/network/security admin) performs an initial portal and gateway configuration to set-up the infrastructure for a large scale VPN deployment. For example, the administrator can perform the certificate creation. The certificate creation process can include creating a root certificate to be used with the portal, creating SSL certificates for the portal and the gateway, configuring an OCSP responder, selecting the location and the certificate authority the OCSP responder is used for, entering the OCSP responder URL for an Authority Information Access attribute, and providing a service configuration, such as network interface, IP address, and server certificate.

Also, the administrator can perform the portal setup. The portal setup process can include creating a new portal configuration and assigning the portal SSL certificate to it, and also configuring the authentication and certificate profile and assigning the portal configuration to a group of user accounts (e.g., used to enroll new satellite devices).

Also, the administrator can perform the gateway setup. The gateway setup process can include configuring the gateway and setting access routes to be used with inbound clients.

Also, the administrator can perform the satellite settings configuration. The configuring of the satellite settings can include adding a list of serial numbers of satellite devices to the configuration and defining a list of gateways for this configuration, using the portal to perform such configurations. The configuring of the satellite settings can further include selecting an issue certificate, in order to issue a valid certificate to clients with valid authentication credentials but an untrusted certificate, selecting the root CA certificate created earlier to be used for issuing client certificates, and selecting "Accept published routes" so that the gateway firewall will install routes published by the satellites.

Referring to FIG. 2, at 202, a satellite generates a key pair and a certificate signing request (CSR) (e.g., the key pair is used to generate the CSR as described herein). For example, the key pair can be a public key and a private key pair based on public key infrastructure (PKI) techniques. In PKI systems, a certificate signing request (e.g., also referred to as a CSR or certification request) is a message sent from an applicant to a certificate authority to apply for a digital identity certificate (e.g., digital certificate or certificate). Before creating a CSR, the applicant first generates a key pair (e.g., a public key and a private key), keeping the private key secret. The CSR generally includes information identifying the applicant (e.g., a distinguished name in the case of an X.509 certificate, or as described herein with respect to various embodiments, a unique serial number of the device), and the public key generated by the applicant. The CSR can be accompanied by other credentials or proofs of identity required by the certificate authority, and the certificate authority can also contact the applicant for further information. In this example, the satellite generates the key pair, and then generates a CSR using the key pair, in which the CSR also includes the unique serial number of the satellite. The satellite then sends the CSR to the portal in order to apply for a digital identity certificate (e.g., digital certificate or certificate) for the satellite and to obtain configuration information (e.g., including gateway configuration information) for the satellite, as further described below.

At 204, the satellite sends the signed certificate request (CSR) to the portal. For example, the CSR can also include the unique serial number associated with the satellite, which can then be used by the portal to verify the satellite and provide configuration information (e.g., including gateway configuration information) to the satellite in response to the CSR, as further described below.

At 206, the portal attempts to verify the satellite based on the CSR. In some embodiments, an initial enrollment of a satellite includes authenticating the satellite with the portal using the serial number of the satellite. In some embodiments, as part of an initial enrollment of the satellite, the portal verifies the CSR, and then also determines whether the serial number of the satellite matches a serial number in the list of satellites as previously configured with the portal. For example, a deployed satellite can automatically attempt to communicate with the portal. In some cases, the satellite can authenticate the portal's certificate before accepting the connection with the portal. The satellite then authenticates to the portal using its unique serial number (e.g., the serial number of the satellite can be included in the CSR, as discussed above). The portal verifies the serial number using its configured list of satellite devices. In some cases, if the serial number cannot be verified (e.g., the serial number is not in the configured list of satellite devices maintained by the portal), then the portal returns an error message, as shown at 208. In some cases, at this point, the portal can also prompt the administrator to authenticate with the administrator's user credentials (e.g., and the portal can then attempt to verify the credentials provided using the authentication profile configured in the portal configuration, and successful initial enrollment is contingent on a successful username/password-based authentication at this point). After the satellite successfully connects to the portal for the first time, the serial number in the user interface of the portal can be augmented with the satellite's hostname. In some embodiments, a new entry is created in the satellite list of the large scale VPN configuration. In some embodiments, the portal provides the portal configuration associated with the authenticating user (e.g., if the configuration associated with the satellite needs to be changed later, the administrator can move the serial number to the corresponding portal configuration).

At 210 (e.g., the portal has successfully verified the satellite), the portal sends the satellite a unique certificate (CERT) and configuration information (e.g., including gateway configuration information). For example, the portal can use a configured issuing certificate to issue a new client certificate (e.g., an IPSec client certificate) from the presented certificate. The certificate and configuration information (e.g., including gateway configuration information) can then be sent back to the satellite. The satellite can store the certificate locally (e.g., securely stored in a cache/memory or other local storage element of the satellite device). The satellite can also store the gateway configuration information locally (e.g., stored in a cache/memory or other local storage element of the satellite device, in which such cached configuration information can be used if the portal becomes unavailable, and, in some cases, the configuration information can require updating/refreshing based on a configuration lifetime parameter). In some cases, the satellite is a security appliance, and the configuration information can include configuration information for the security appliance, such as an integrated security appliance that includes a VPN, firewall, and/or other security functions such as intrusion detection/prevention, content filtering, and/or data loss prevention (e.g., firewall policy/rules, and/or other security configuration information can be provided to the security appliance to further automate the deployment and management of the remotely deployed security appliance).

At 212, the satellite uses the certificate to attempt to connect to one or more gateways based on the configuration information. At 214, the satellite establishes VPN connections with each of the gateways (e.g. based on the gateway configuration information) using its certificate for authentication. For example, the satellite can contact all available gateways using its certificate for authentication. The satellite and gateway each verify the presented certificates, respectively and check for revocation. In particular, the VPN connection set-up can include the satellite submitting a list of routes to the gateway (e.g., the gateway will accept those that pass its route filter, and any routes that are blocked will be reported back to the satellite). Also, the gateway can provide the satellite with the list of configured routes. IPSec tunnels can then be established. In particular, IPSec key material can be exchanged in the SSL control channel before establishing the IPSec tunnels. For tunnels with duplicate routes, the branch firewall can maintain all tunnels and set high and low route metrics based on the priority of the gateways.

In some embodiments, certificates are short term life (STL) certificates. At 216, the satellite receives another unique CERT periodically (e.g., STL CERT(s) received from the portal, using a push or pull renewal process as described herein). In some embodiments, renewing certificates is automatically facilitated using the portal (e.g., the portal can also serve as a trusted certificate authority (CA)). For example, the portal can periodically check a list of expiring certificates (e.g., every 24 hours or some other time interval). The portal can automatically renew client certificates that will expire with a predetermined period of time (e.g., for certificates that are within 5 days of the expiration date of the SLT CERT). For clients (e.g., satellites) with such expiring certificates, when such a satellite authenticates to the portal to retrieve its latest configuration information and certificate, the portal sends the new STL CERT to the satellite as well as the latest gateway configuration information for the satellite. The satellite can then install the new STL CERT and implement the new gateway configuration information (e.g., the satellite rekeys its VPN connections to the gateways using the new STL CERT).

At 218, the satellite does not receive a STL CERT, and secured connections time-out after expiration of current STL CERT. In some embodiments, VPN access to the gateways for the satellite can be revoked for various reasons. For example, revoking satellite access can be performed by having an administrator using the portal to navigate to a satellite list and deleting the entry for the particular satellite to be revoked (e.g., the serial number entry is removed from the portal configuration such that the entry is removed from the satellite list). As a result, the certificate is automatically revoked (e.g., the OCSP responder can provide a revocation status to participating devices to indicate which certificates have been revoked, and each of the participating devices can cache the most current revocation status provided by the OCSP responder). In some cases, for ongoing authentication, if the OCSP responder is unavailable, presented certificates can be considered valid (e.g., not revoked), unless a revocation status is cached and indicates that the certificate has been revoked. However, the revoked satellite will not receive a new STL CERT, and thus, the STL CERT currently installed and used by the satellite eventually expires based on its expiration date. Thus, using such techniques, even if the OCSP responder is unavailable, the satellite would no longer be able to use the expired STL CERT to establish or maintain VPN connections with the various gateways.

In some embodiments, a new gateway can be added to the large scale VPN deployment. For example, an administrator can log into the portal device and create a new key and certificate using the same issuing CA used to create the satellite and other gateway certificates. The administrator exports the certificate (e.g., as a PKCS12 file) and imports it into the gateway together with the issuing CA certificate. The administrator configures the client certificate profiles and the gateway. The administrator then adds the IP address for the new gateway and configures the new gateway configuration information associated with the gateway. Various other approaches can be used to add a new gateway to the large scale VPN deployment as will now be apparent to one of ordinary skill in the art in view of the various embodiments described herein.

In some embodiments, a gateway can be decommissioned from the large scale VPN deployment. For example, an administrator can log into the portal device and navigate to the certificates section in the device configuration. The administrator then locates the gateway certificate of the decommissioned gateway and revokes it. The administrator navigates to the portal configuration and removes the gateway's IP address from the portal configuration and commits the new configuration. Various other approaches can be used to decommission a gateway from the large scale VPN deployment as will now be apparent to one of ordinary skill in the art in view of the various embodiments described herein.

In some embodiments, CA certificate renewal is provided using the portal. For example, the administrator can log into the portal device and navigate to a certificate management screen in the device section. The administrator selects the CA certificate and clicks renew. The administrator is prompted to enter a new expiration time (e.g., in days). The administrator commits the configuration, which causes the renewed certificate to be written to the portal configuration, and the renewed certificate is provided to the satellite(s). The new certificate can then be retrieved by each of the satellites and installed locally on each of the satellites. Various other approaches can be used to provide CA certificate renewal using the portal in the large scale VPN deployment as will now be apparent to one of ordinary skill in the art in view of the various embodiments described herein.

Figure 3:
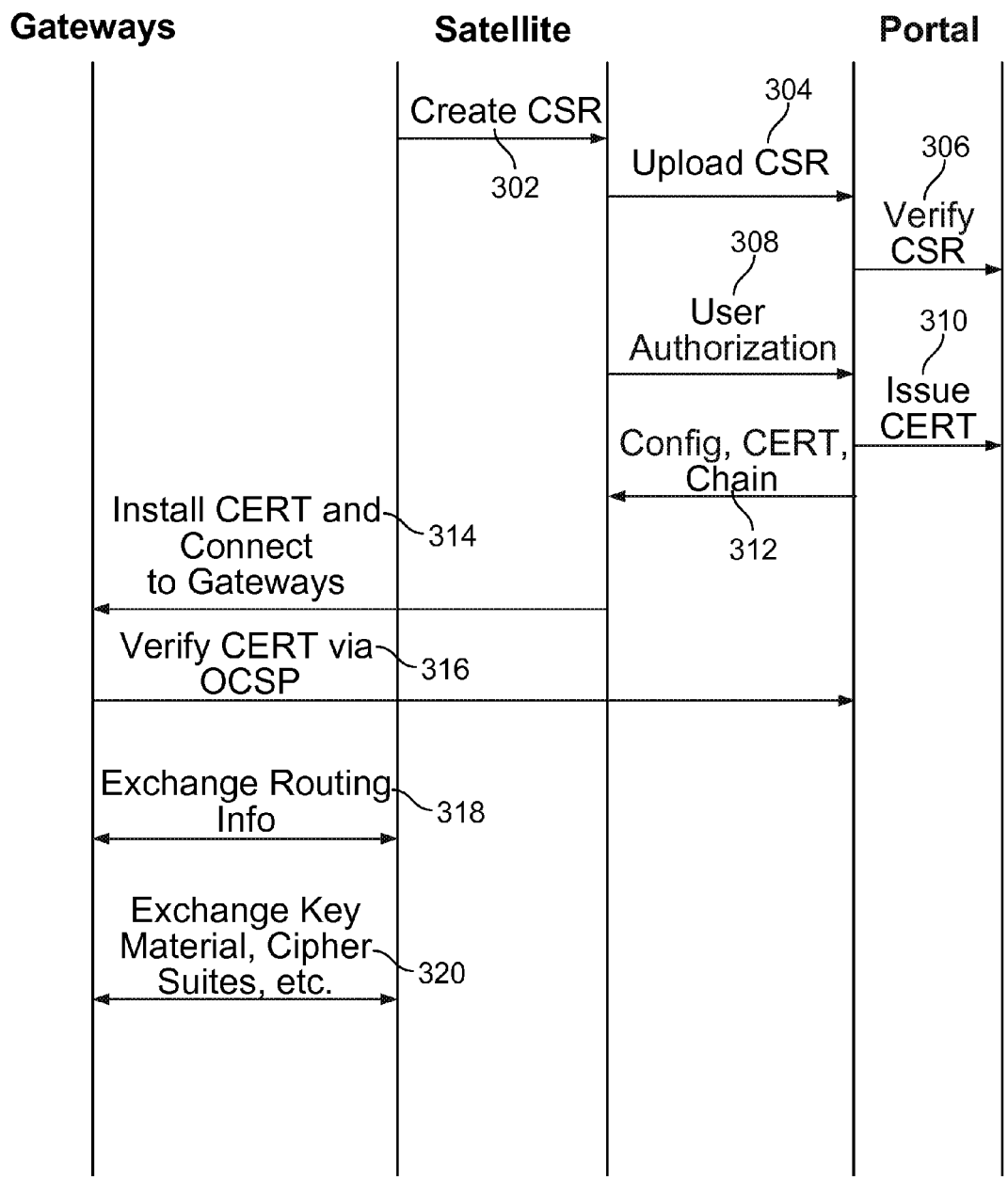
FIG. 3 is a protocol flow diagram illustrating credentials management in large scale VPN deployment in accordance with some embodiments.

FIG. 3 is a protocol flow diagram illustrating credentials management in large scale VPN deployment in accordance with some embodiments. At 302, the satellite set-up process is performed including generating a key pair (e.g., a public/private key pair, as described above) and generating a certificate signing request (CSR) (e.g., the CSR can include a serial number associated with the satellite). At 304, the satellite sends the CSR to the portal and authenticates to the portal using the unique serial number associated with the satellite. At 306, the portal verifies the serial number of the satellite presented with the CSR. At 308, if the portal cannot verify the satellite based on the serial number, then the portal requires authentication with a valid user account (e.g., username and password credentials of an authorized user logging into the portal). At 310, the portal issues a certificate (e.g., with its own CA). At 312, the portal sends the certificate and configuration information including gateway configuration information (e.g., configuration information, certificate, and certification chain) to the satellite. At 314, the satellite installs the certificate, and the satellite attempts to connect to available gateways (e.g., communicating using a secure sockets layer (SSL) protocol) using the satellite's certificate for authentication (e.g., and can measure connection performance). At 316, the gateways verify the satellite's certificate with the portal (e.g., through the OCSP responder to determine whether the certificate is still valid and has not been revoked, using the OCSP protocol). At 318, the gateways and the satellite exchange routing information about known and connected subnets (e.g., communicating using SSL). At 320, the gateways and the satellite establish VPN connections. For example, the gateways and the satellite can exchange key material, cipher suites, and/or other information/material to establish secure tunnels (e.g., communicating using IKE and IPSec protocols or other secure communication protocols) and set routes/metrics based on gateway performance.

Figure 4:
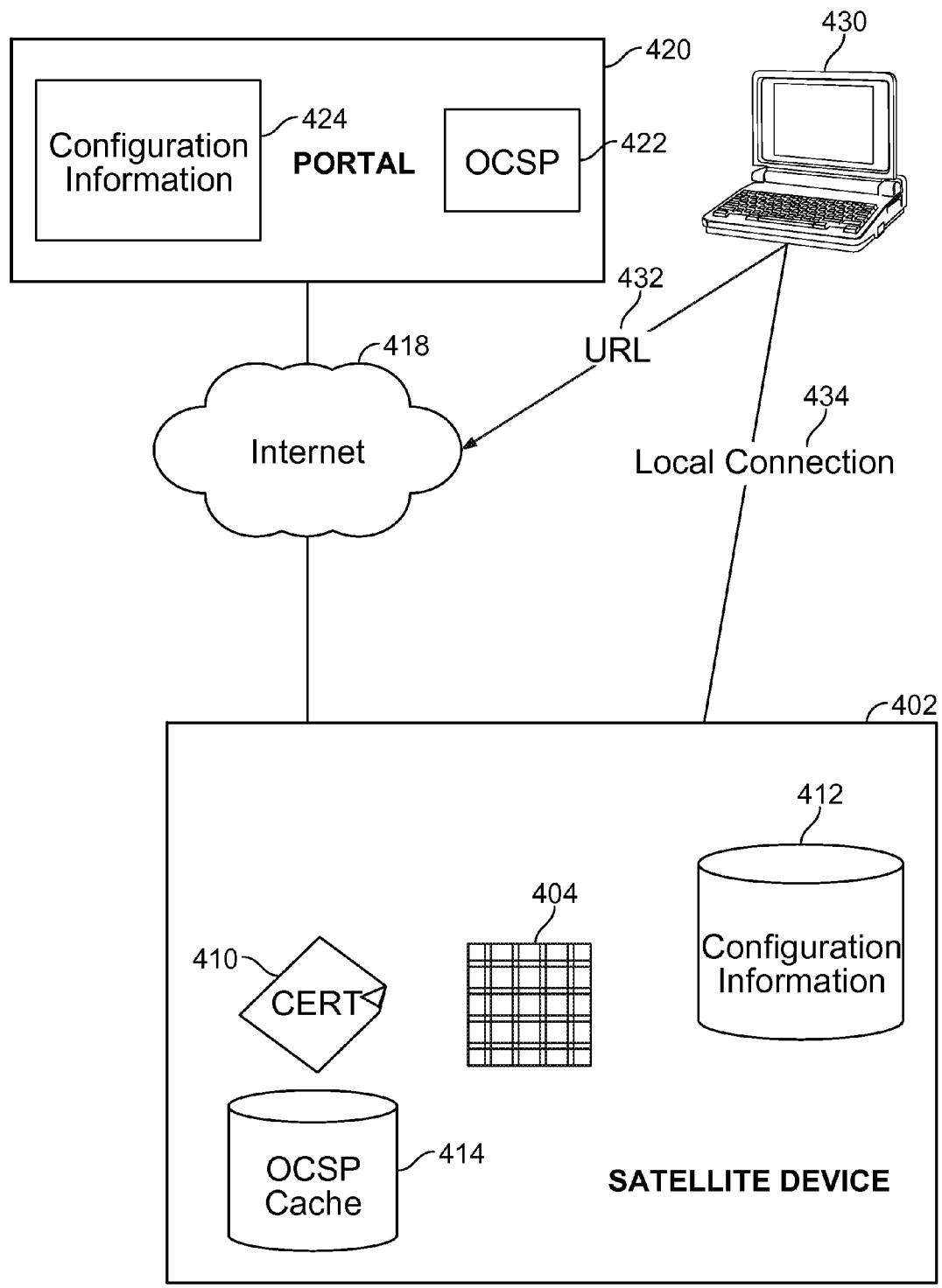
FIG. 4 is a functional block diagram illustrating a logical architecture for credentials management in large scale VPN deployment in accordance with some embodiments.

FIG. 4 is a functional block diagram illustrating a logical architecture for credentials management in large scale VPN deployment in accordance with some embodiments. As shown, a satellite device 402 includes a processor 404, a certificate 410 (e.g., received from the portal 420), configuration information 412 (e.g., including gateway configuration information and other configuration information for the satellite device), and OCSP cache 414 (e.g., for caching OCSP status information received from the OCSP responder 422). The satellite device 402 is in communication with a portal 420 over the Internet 418.

As also shown, the portal 420 includes configuration information 424 (e.g., gateway configuration information and satellite device configuration information for one or more managed satellite devices in a large scale VPN deployment). The portal 420 also includes an OCSP responder 422 for providing OCSP status information to the gateways and satellite devices (e.g., satellite device 402) in the large scale VPN deployment. In some embodiments, each device (e.g., satellite and gateway device) is configured to attempt to verify a serial number of a new device attempting to connect to it using the OCSP list. In some embodiments, the OCSP list is periodically cached in OCSP cache 414 (e.g., to avoid having to communicate with the portal if the OCSP cache information is still current, and/or if the portal is unavailable as described herein with respect to various embodiments).

As also shown, a computing device 430 (e.g., a lap top, desktop computer, work station, tablet, mobile phone, and/or other computing device) is in communication with the satellite device 402 via a local connection 434 and is in communication with the portal via the Internet 418 using a URL to access the portal (432).

Figure 5:
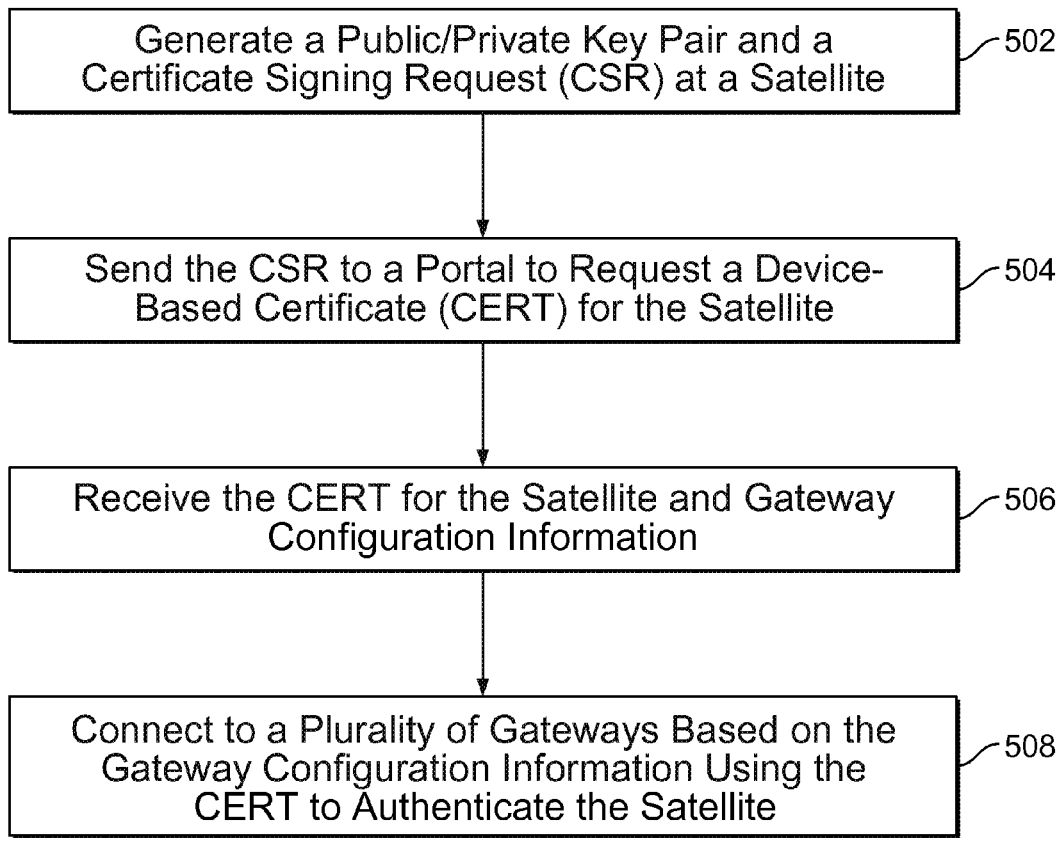
FIG. 5 is another flow diagram illustrating credentials management in large scale VPN deployment in accordance with some embodiments.

FIG. 5 is another flow diagram illustrating credentials management in large scale VPN deployment in accordance with some embodiments. At 502, generating a public/private key pair and a certificate signing request (CSR) is performed at a satellite (e.g., satellite device). At 504, sending the CSR to a portal is performed to request a device-based certificate (CERT) for the satellite. At 506, the CERT for the satellite and gateway configuration information are received. At 508, connecting to a plurality of gateways based on the gateway configuration information is performed using the CERT to authenticate the satellite.

Figure 6:
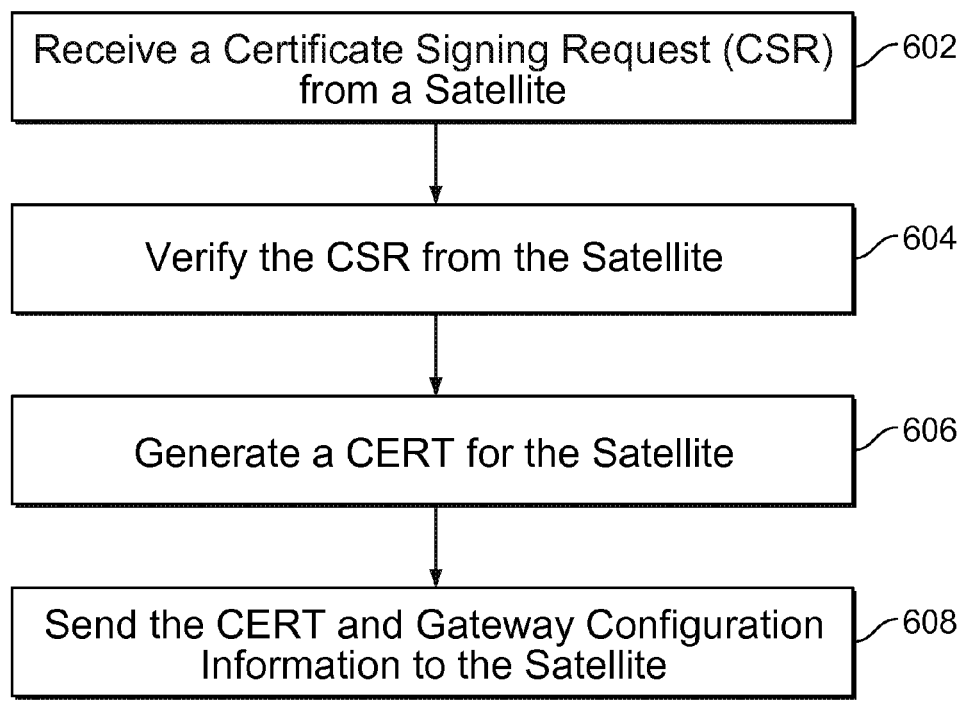
FIG. 6 is another flow diagram illustrating credentials management in large scale VPN deployment in accordance with some embodiments.

FIG. 6 is another flow diagram illustrating credentials management in large scale VPN deployment in accordance with some embodiments. At 602, a certificate signing request (CSR) is received at a portal from a satellite (e.g., a satellite device). At 604, the portal verifies the CSR from the portal (e.g., verifying the CSR and the serial number of the satellite, in which the CSR includes the serial number of the satellite). At 606 (assuming the verification of the CSR was successful), the portal generates a certificate (CERT) for the satellite. At 608, the portal sends the CERT and gateway configuration information to the satellite.

Figure 7:
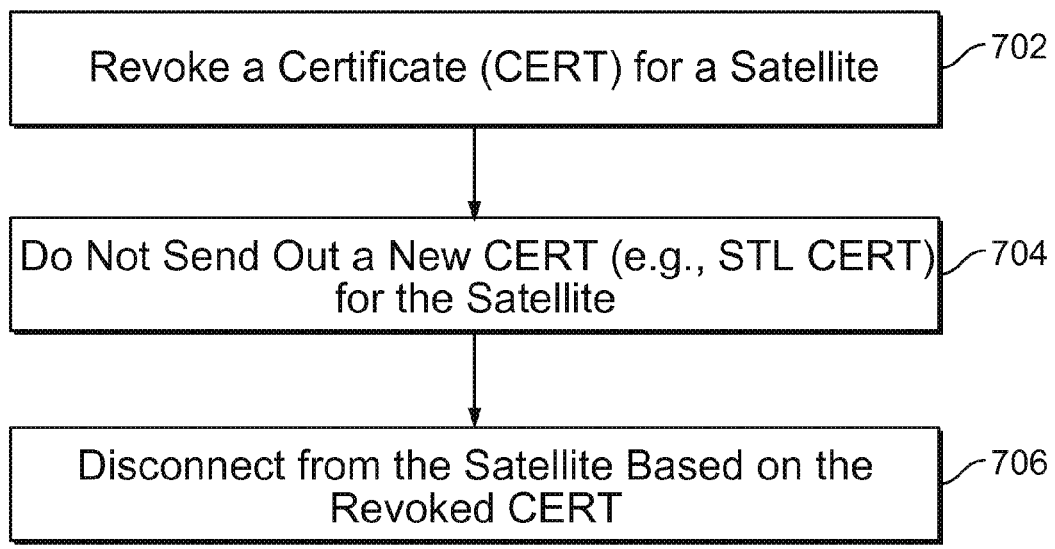
FIG. 7 is another flow diagram illustrating credentials management in large scale VPN deployment in accordance with some embodiments.

FIG. 7 is another flow diagram illustrating credentials management in large scale VPN deployment in accordance with some embodiments. At 702, a certificate (CERT) is revoked for a satellite. At 704, the portal does not send out a new CERT (e.g., STL CERT) for the satellite (e.g., so that the STL CERT installed/stored by the satellite eventually expires based on the expiration period). At 706, one or more gateways and/or the portal disconnect from the satellite based on the revoked and/or expired CERT pursuant to the techniques described herein with respect to various embodiments.

FIG. 8 is a computer screen diagram of a graphical user interface of a portal for configuring and managing credentials management in large scale VPN deployment in accordance with some embodiments. As shown, an administrator can use the portal to configure a satellite to connect with one or more gateways for a large scale VPN deployment for an enterprise. Various other interfaces can be provided to allow an administrator to use the portal to configure a satellite to connect with one or more gateways for a large scale VPN deployment for an enterprise as will now be apparent to one of ordinary skill in the art in view of the various embodiments described herein.

FIG. 9 is another computer screen diagram of a graphical user interface of a portal for configuring and managing credentials management in large scale VPN deployment in accordance with some embodiments. As shown, an administrator can use the portal to view a satellite tunnel status and run-time configuration of a large scale VPN deployment for an enterprise. Various other interfaces can be provided to allow an administrator to use the portal to view a satellite tunnel status and run-time configuration of a large scale VPN deployment for an enterprise as will now be apparent to one of ordinary skill in the art in view of the various embodiments described herein.

Figure 10:
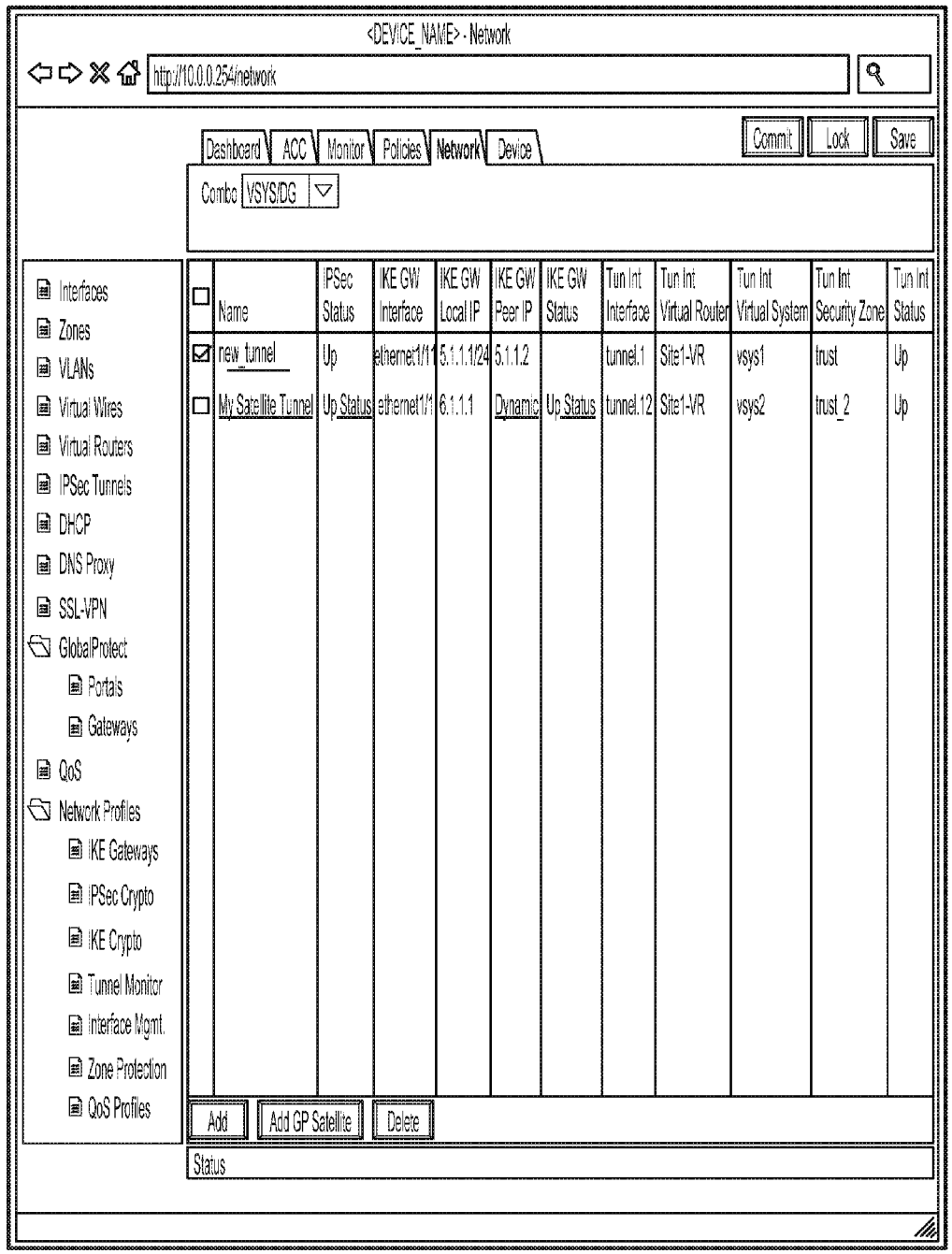
FIG. 10 is another computer screen diagram of a graphical user interface of a portal for configuring and managing credentials management in large scale VPN deployment in accordance with some embodiments.

FIG. 10 is another computer screen diagram of a graphical user interface of a portal for configuring and managing credentials management in large scale VPN deployment in accordance with some embodiments. As shown, an administrator can use the portal to view a satellite tunnel status and run-time configuration of a large scale VPN deployment for an enterprise. Various other interfaces can be provided to allow an administrator to use the portal to view a satellite tunnel status and run-time configuration of a large scale VPN deployment for an enterprise as will now be apparent to one of ordinary skill in the art in view of the various embodiments described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for credentials management in large scale virtual private network (VPN) deployment, comprising:
    a processor of a satellite device configured to:
        generate a public/private key pair and a certificate signing request;
        automatically communicate the certificate signing request to a portal over a public, untrusted network to authenticate the satellite device using a serial number associated with the satellite device, wherein the satellite device automatically communicates with the portal at a portal address to register the satellite device with the portal by executing a boot-up process or script, and wherein the certificate signing request and the serial number are verified by the portal;
        receive a certificate from the portal for using to establish VPN connections and configuration information for the satellite device, wherein the certificate includes a credential signed by the portal as a trusted certificate authority, and wherein the configuration information includes gateway configuration information identifying a plurality of gateways to which the satellite device is configured to connect using VPN connections; and
        automatically attempt to connect the satellite device to each of the plurality of gateways using the certificate to authenticate the satellite, wherein the satellite attempts to establish VPN connections with each of the plurality of gateways, wherein each of the plurality of gateways verifies the certificate based on Online Certificate Status Protocol (OCSP) status information, and in the event that the certificate is valid and has not been revoked, allows the attempt to establish the VPN connection, and wherein de-authorization of the satellite device includes removing the serial number associated with the satellite device from a portal configuration, and wherein the certificate for the satellite device is automatically revoked; and
    a memory coupled to the processor and configured to provide the processor with instructions.

2. The system recited in claim 1, wherein the satellite device comprises a security appliance that includes a VPN client, and wherein the configuration information further comprises a firewall policy.

3. The system recited in claim 1, wherein the certificate is a short term life certificate.

4. The system recited in claim 1, wherein the portal sends a unique short term life certificate to each VPN client of the plurality of gateways.

5. The system recited in claim 1, wherein the portal sends a unique short term life (STL) certificate for each VPN client of the plurality of gateways, and wherein the portal automatically sends out new STL certificates to each of the plurality of gateways prior to expiration of the STL certificates.

6. The system recited in claim 1, wherein the certificate further includes identification of one or more trusted certificate authorities.

7. The system recited in claim 1, wherein the authentication request is verified by the portal using Public Key Infrastructure (PKI).

8. The system recited in claim 1, wherein the authentication request is verified by the portal using Public Key Infrastructure (PKI), and wherein the portal is a certificate authority.

9. The system recited in claim 1, wherein each of the plurality of gateways verifies that the certificate is from a trusted certificate authority.

10. The system recited in claim 1, wherein each of the plurality of gateways verifies that the certificate is still valid and has not expired.

11. The system recited in claim 1, wherein the processor is further configured to:
    verify a portal certificate using a list of trusted certificate authorities that are pre-loaded on the satellite device.

12. The system recited in claim 1, wherein each of the plurality of gateways is configured to:
    determine whether the serial number associated with the satellite device is on an Online Certificate Status Protocol (OCSP) list of the portal; and
    in the event that the serial number associated with the satellite device is not on the OCSP list of the portal, reject the attempt to establish the VPN connection.

13. The system recited in claim 1, wherein the processor is further configured to:
automatically attempt to connect the satellite device to a first gateway using the certificate to authenticate the satellite device, wherein the first gateway is one of the plurality of gateways to which the satellite device is configured to connect using VPN connections, wherein the satellite device attempts to establish a VPN connection with the first gateway, and wherein the first gateway checks whether the certificate has been revoked based on Online Certificate Status Protocol (OCSP) status information, and in the event that the certificate has been revoked, rejects the attempt to establish the VPN connection.

14. The system recited in claim 1, wherein the portal determines whether the certificate has expired; and in the event that the certificate has expired, the serial number associated with the satellite device is removed from an Online Certificate Status Protocol (OCSP) list stored by the portal.

15. The system recited in claim 1, wherein a first gateway of the plurality of gateways is de-authorized, wherein de-authorization of the first gateway includes one or more of the following: the satellite device checking a revocation list at the portal, the satellite device checking the revocation list at a VPN connection with the first gateway, the satellite device checking the revocation list at a re-key time, and removing a serial number associated with the first gateway from the gateway configuration information stored at the portal such that the first gateway can no longer renew its certificate and/or does not automatically receive a new short term life (STL) certificate.

16. The system recited in claim 1, wherein the satellite device receives a list of configured routes from a first gateway of the plurality of gateways, wherein secure tunnels can then be established using one or more of the configured routes, and wherein for secure tunnels with duplicate routes, the satellite device is configured to determine route metrics based on a priority of each of the plurality of gateways.

17. A method of credentials management in large scale virtual private network (VPN) deployment, comprising:
generating a public/private key pair and a certificate signing request using a processor of a satellite device;
automatically communicating the certificate signing request to a portal over a public, untrusted network to authenticate the satellite device using a serial number associated with the satellite device, wherein the satellite device automatically communicates with the portal at a portal address to register the satellite device with the portal by executing a boot-up process or script, and wherein the certificate signing request and the serial number are verified by the portal;
receiving a certificate from the portal for using to establish VPN connections and configuration information for the satellite device, wherein the certificate includes a credential signed by the portal as a trusted certificate authority, and wherein the configuration information includes gateway configuration information identifying a plurality of gateways to which the satellite device is configured to connect using VPN connections; and
automatically attempting to connect the satellite device to each of the plurality of gateways using the certificate to establish VPN connections with each of the plurality of gateways, wherein each of the plurality of gateways verifies the certificate based on Online Certificate Status Protocol (OCSP) status information, and in the event that the certificate is valid and has not been revoked, allows the attempt to establish the VPN connection, and wherein de-authorization of the satellite device includes removing the serial number associated with the satellite device from a portal configuration, and wherein the certificate for the satellite device is automatically revoked.

18. The method of claim 17, further comprising:
automatically attempting to connect the satellite device to a first gateway using the certificate to authenticate the satellite device, wherein the satellite device attempts to establish a VPN connection with the first gateway, and wherein the first gateway verifies that the certificate is from a trusted certificate authority.

19. The method of claim 17, further comprising:
automatically attempting to connect the satellite device to a first gateway using the certificate to authenticate the satellite, wherein the satellite device attempts to establish a VPN connection with the first gateway, and wherein the first gateway verifies that the certificate is still valid and has not expired.

20. The method of claim 17, further comprising:
automatically attempting to connect the satellite device to a first gateway using the certificate to authenticate the satellite device, wherein the satellite device attempts to establish a VPN connection with the first gateway, and wherein the first gateway checks whether the certificate has been revoked based on Online Certificate Status Protocol (OCSP) status information, and in the event that the certificate has been revoked, rejects the attempt to establish the VPN connection.

21. The method of claim 17, wherein the portal determines whether the certificate has expired; and in the event that the certificate has expired, the serial number associated with the satellite device is removed from an Online Certificate Status Protocol (OCSP) list stored by the portal.

22. The method of claim 17, wherein the satellite device comprises a security appliance that includes a VPN client, and wherein the configuration information further comprises a firewall policy.

23. The method of claim 17, wherein the certificate is a short term life certificate.

24. The method of claim 17, wherein the portal sends a unique short term life certificate to each VPN client of the plurality of gateways.

25. The method of claim 17, wherein the portal sends a unique short term life (STL) certificate for each VPN client of the plurality of gateways, and wherein the portal automatically sends out new STL certificates to each of the plurality of gateways prior to expiration of the STL certificates.

26. The method of claim 17, wherein the certificate further includes identification of one or more trusted certificate authorities.

27. The method of claim 17, wherein the authentication request is verified by the portal using Public Key Infrastructure (PKI).

28. The method of claim 17, wherein the authentication request is verified by the portal using Public Key Infrastructure (PKI), and wherein the portal is a certificate authority.

29. The method of claim 17, wherein each of the plurality of gateways verifies that the certificate is from a trusted certificate authority.

30. The method of claim 17, wherein each of the plurality of gateways verifies that the certificate is still valid and has not expired.

31. The method of claim 17, further comprising:
verifying a portal certificate using a list of trusted certificate authorities that are pre-loaded on the satellite device.

32. The method of claim 17, further comprising:
  determining whether the serial number associated with the satellite device is on an Online Certificate Status Protocol (OCSP) list of the portal; and
  in the event that the serial number associated with the satellite device is not on the OCSP list of the portal, rejecting the attempt to establish the VPN connection.

33. The method of claim 17, further comprising:
  automatically attempting to connect the satellite device to a first gateway using the certificate to authenticate the satellite device, wherein the first gateway is one of the plurality of gateways to which the satellite device is configured to connect using VPN connections, wherein the satellite device attempts to establish a VPN connection with the first gateway, and wherein the first gateway checks whether the certificate has been revoked based on Online Certificate Status Protocol (OCSP) status information, and in the event that the certificate has been revoked, rejects the attempt to establish the VPN connection.

34. The method of claim 17, wherein a first gateway of the plurality of gateways is de-authorized, wherein de-authorization of the first gateway includes one or more of the following: the satellite device checking a revocation list at the portal, the satellite device checking the revocation list at a VPN connection with the first gateway, the satellite device checking the revocation list at a re-key time, and removing a serial number associated with the first gateway from the gateway configuration information stored at the portal such that the first gateway can no longer renew its certificate and/or does not automatically receive a new short term life (STL) certificate.

35. The method of claim 17, wherein the satellite device receives a list of configured routes from a first gateway of the plurality of gateways, wherein secure tunnels can then be established using one or more of the configured routes, and wherein for secure tunnels with duplicate routes, the satellite device is configured to determine route metrics based on a priority of each of the plurality of gateways.

36. A computer program product for credentials management in large scale virtual private network (VPN) deployment, the computer program product being embodied in a tangible non-transitory computer readable storage medium and comprising computer instructions for:
  generating a public/private key pair and a certificate signing request on a satellite device;
  automatically communicating the certificate signing request to a portal over a public, untrusted network to authenticate the satellite device using a serial number associated with the satellite device, wherein the satellite device automatically communicates with the portal at a portal address to register the satellite device with the portal by executing a boot-up process or script, and wherein the certificate signing request and the serial number are verified by the portal, and
  receiving a certificate from the portal for using to establish VPN connections and configuration information for the satellite device, wherein the certificate includes a credential signed by the portal as a trusted certificate authority, and wherein the configuration information includes gateway configuration information identifying a plurality of gateways to which the satellite device is configured to connect using VPN connections; and
  automatically attempting to connect the satellite device to each of the plurality of gateways using the certificate to establish VPN connections with each of the plurality of gateways, wherein each of the plurality of gateways verifies the certificate based on Online Certificate Status Protocol (OCSP) status information, and in the event that the certificate is valid and has not been revoked, allows the attempt to establish the VPN connection, and wherein de-authorization of the satellite device includes removing the serial number associated with the satellite device from a portal configuration, and wherein the certificate for the satellite device is automatically revoked.

* * * * *